(12) United States Patent
Li et al.

(10) Patent No.: US 9,641,634 B2
(45) Date of Patent: May 2, 2017

(54) INFORMATION PUSH METHOD AND APPARATUS

(71) Applicant: Huawei Technologies Co., Ltd., Shenzhen, Guangdong (CN)

(72) Inventors: Huafei Li, Beijing (CN); Yibo Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 307 days.

(21) Appl. No.: 14/284,867

(22) Filed: May 22, 2014

(65) Prior Publication Data
US 2014/0351179 A1 Nov. 27, 2014

(30) Foreign Application Priority Data

May 27, 2013 (CN) .......................... 2013 1 0201744

(51) Int. Cl.
*H04L 29/08* (2006.01)
*H04L 12/58* (2006.01)
(Continued)

(52) U.S. Cl.
CPC ........ *H04L 67/26* (2013.01); *G06F 17/30702* (2013.01); *G06F 17/30867* (2013.01);
(Continued)

(58) Field of Classification Search
None
See application file for complete search history.

(56) References Cited

U.S. PATENT DOCUMENTS

| 7,933,856 B2 | 4/2011 | Verspoor et al. |
| 8,583,674 B2 * | 11/2013 | Zheleva ............ G06F 17/30035 705/26.7 |

(Continued)

FOREIGN PATENT DOCUMENTS

| CA | 2855008 A1 | 5/2013 |
| CN | 1841380 A | 10/2006 |

(Continued)

OTHER PUBLICATIONS

Huang et al., "A review of information recommendation in social media," CAAI Transactions on Intelligent Systems, vol. 7, No. 1 (Feb. 2012).

*Primary Examiner* — Alan Chen
(74) *Attorney, Agent, or Firm* — Leydig, Voit & Mayer, Ltd.

(57) ABSTRACT

The present invention is applicable to the field of information processing technologies, and provides an information push method and apparatus. The method includes: acquiring historical behavior information of a user from a social data source; dividing, according to a preset rule, the acquired historical behavior information into one or more documents related to user behavior information; obtaining a model according to the document and by using a statistical learning method; and generating push information based on the model, and sending the push information to a client where a corresponding user is located. The push information in the present invention is generated based on the historical behavior information of the user, so that accuracy of information push can be effectively improved.

17 Claims, 4 Drawing Sheets

(51) Int. Cl.
*G06F 17/30* (2006.01)
*G06N 5/04* (2006.01)
*G06N 99/00* (2010.01)

(52) U.S. Cl.
CPC .............. *G06N 5/04* (2013.01); *G06N 99/005* (2013.01); *H04L 51/14* (2013.01); *H04L 51/32* (2013.01); *H04L 67/306* (2013.01)

(56) References Cited

U.S. PATENT DOCUMENTS

| | | | |
|---|---|---|---|
| 2005/0132014 A1* | 6/2005 | Horvitz | G06Q 30/02 709/206 |
| 2006/0224579 A1 | 10/2006 | Zheng | |
| 2008/0005072 A1 | 1/2008 | Meek et al. | |
| 2008/0243632 A1 | 10/2008 | Kane et al. | |
| 2008/0249987 A1 | 10/2008 | Ogasawara | |
| 2009/0164897 A1 | 6/2009 | Amer-Yahia et al. | |
| 2010/0030772 A1 | 2/2010 | Zilca et al. | |
| 2010/0070315 A1 | 3/2010 | Lu et al. | |
| 2010/0169153 A1 | 7/2010 | Hwacinski et al. | |
| 2011/0179081 A1* | 7/2011 | Ovsjanikov | G06F 17/30867 707/780 |
| 2011/0218948 A1 | 9/2011 | De Souza et al. | |
| 2011/0288935 A1 | 11/2011 | Elvekrog et al. | |
| 2012/0030287 A1 | 2/2012 | Leonard | |
| 2012/0166452 A1 | 6/2012 | Tseng | |
| 2012/0226651 A1 | 9/2012 | Chidlovskii | |
| 2012/0278740 A1 | 11/2012 | Robinson et al. | |
| 2013/0031106 A1 | 1/2013 | Schechter et al. | |
| 2014/0207518 A1* | 7/2014 | Kannan | G06Q 30/0201 705/7.29 |
| 2014/0236943 A1* | 8/2014 | Li | G06F 17/30699 707/736 |

FOREIGN PATENT DOCUMENTS

| | | |
|---|---|---|
| CN | 101286173 A | 10/2008 |
| CN | 101903874 A | 12/2010 |
| CN | 102265649 A | 11/2011 |
| CN | 102413076 A | 4/2012 |
| CN | 102609465 A | 7/2012 |
| CN | 102611785 A | 7/2012 |
| CN | 103294800 A | 9/2013 |
| WO | WO 2013074367 A2 | 5/2013 |

* cited by examiner

INFORMATION PUSH METHOD AND APPARATUS

CROSS-REFERENCE TO RELATED APPLICATION

This application claims priority to Chinese Patent Application No. 201310201744.5, filed on May 27, 2013, which is hereby incorporated by reference in its entirety.

TECHNICAL FIELD

The present invention relates to the field of information processing technologies, and in particular, to an information push method and apparatus.

BACKGROUND

An information push technology in an existing social network is to push information mainly based on static profile data input by a user, for example, people or information with a same or similar attribute is pushed to a user according to an attribute such as a location, an age, a gender, a school, or a hobby of the user. This information push manner is excessively dependent on personal information filled in by the user, and the personal information filled in by the user is often excessively simple or even is not real enough and is hard to accurately reflect an actual situation of the user; as a result, accuracy of information push is low and the user experience is affected.

SUMMARY

An objective of embodiments of the present invention is to provide an information push method, so as to solve, to some extent, a problem that accuracy of information push in the prior art is low.

According to a first aspect, an information push method includes:

acquiring historical behavior information of a user from a social data source;

dividing, according to a preset rule, the acquired historical behavior information into one or more documents related to user behavior information;

obtaining a model according to the document and by using a statistical learning method; and generating push information based on the model, and sending the push information to a client where a corresponding user is located.

In a first possible implementation manner of the first aspect, the dividing, according to a preset rule, the acquired historical behavior information into one or more documents related to user behavior information specifically includes:

dividing, according to a user identifier and time, the acquired historical behavior information into the one or more documents related to the user behavior information.

With reference to the first aspect or the first possible implementation manner of the first aspect, in a second possible implementation manner, after the dividing, according to a preset rule, the acquired historical behavior information into one or more documents related to user behavior information, the method further includes:

extracting characteristic information of each document according to content and/or author information of the document.

With reference to the second possible implementation manner of the first aspect, in a third possible implementation manner, the obtaining a model according to the document and by using a statistical learning method specifically includes:

establishing an initial model according to the document and by using the statistical learning method;

calculating a joint probability of the document according to the extracted characteristic information; and maximizing the joint probability to obtain a parameter of the initial model, so as to obtain a final model.

With reference to the first aspect, the first possible implementation manner of the first aspect, the second possible implementation manner of the first aspect, or the third possible implementation manner of the first aspect, in a fourth possible implementation manner, before the generating push information based on the obtained model, the method further includes:

detecting current behavior information of the user, where correspondingly, the generating push information based on the obtained model specifically includes:

generating, based on the obtained final model and the detected current behavior information of the user, push information matching the current behavior information of the user.

With reference to the fourth possible implementation manner of the first aspect, in a fifth possible implementation manner, the generating, based on the obtained model and the detected current behavior information of the user, push information matching the current behavior information of the user, and sending the push information to a client where a corresponding user is located specifically includes:

generating a list of possible user behaviors based on the obtained model and the detected current behavior information of the user;

scoring a possible user behavior in the list of possible user behaviors; and pushing first N possible user behaviors with a highest score to the client where the corresponding user is located, where the N is greater than or equal to 1.

According to a second aspect, an information push apparatus includes:

a behavior information acquiring unit, configured to acquire historical behavior information of a user from a social data source;

a document acquiring unit, configured to divide, according to a preset rule, the historical behavior information acquired by the behavior information acquiring unit into one or more documents related to user behavior information;

a model obtaining unit, configured to obtain a model according to the document, which is acquired by the document acquiring unit, and by using a statistical learning method; and an information push unit, configured to generate push information based on the model obtained by the model obtaining unit, and send the push information to a client where a corresponding user is located.

In a first possible implementation manner of the second aspect, the document acquiring unit is specifically configured to:

divide, according to a user identifier and time, the acquired historical behavior information into the one or more documents related to the user behavior information.

With reference to the second aspect or the first possible implementation manner of the second aspect, in a second possible implementation manner, the apparatus further includes:

a characteristic information extracting unit, configured to extract characteristic information of each document according to content and/or author information of the document.

With reference to the second possible implementation manner of the second aspect, in a third possible implementation manner, the model obtaining unit includes:

a model establishing module, configured to establish an initial model according to the document and by using the statistical learning method;

a calculating module, configured to calculate a joint probability of the document according to the extracted characteristic information; and a model obtaining module, configured to maximize the joint probability to obtain a parameter of the initial model, so as to obtain a final model.

With reference to the second aspect, the first possible implementation manner of the second aspect, the second possible implementation manner of the second aspect, or the third possible implementation manner of the second aspect, in a fourth possible implementation manner, the apparatus further includes:

an information detecting unit, configured to detect current behavior information of the user, where the information push unit is specifically configured to generate, based on the obtained model and the detected current behavior information of the user, push information matching the current behavior information of the user, and send the push information to the client where the corresponding user is located.

With reference to the fourth possible implementation manner of the second aspect, in a fifth possible implementation manner, the information push unit includes:

a behavior list generating module, configured to generate a list of possible user behaviors based on the obtained model and the detected current behavior information of the user;

a scoring module, configured to score a possible user behavior in the list of possible user behaviors; and an information push module, configured to push first N possible user behaviors with a highest score to the client where the corresponding user is located, where the N is greater than or equal to 1.

Compared with the prior art, the beneficial effects of the embodiments of the present invention are described as follows: In the embodiments of the present invention, when information is pushed, historical behavior information of a user is first acquired; the acquired historical behavior information is divided into one or more documents related to user behavior information; a model is obtained according to the document and by using a statistical learning method; and push information is generated based on the model. With the model, a behavioral habit and a preference of the user can be learned according to the historical behavior information of the user, and push information is generated according to the behavioral habit and the preference of the user, so that accuracy of information push can be effectively improved and user experience can be enhanced.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description merely show some embodiments of the present invention, and persons of ordinary skill in the art may still obtain other drawings from these accompanying drawings without creative efforts.

DESCRIPTION OF EMBODIMENTS

The following descriptions are for description but are not for limitation. Specific details such as a structure of a specific system, an interface, and a technology are provided for thoroughly understanding the embodiments of the present invention. However, persons skilled in the art should be clear that, the present invention can also be implemented in other embodiments without these specific details. In other cases, detailed descriptions about a well-known system, apparatus, circuit, and method are omitted, so as to prevent unnecessary details from hindering the description about the present invention.

Figure 1:
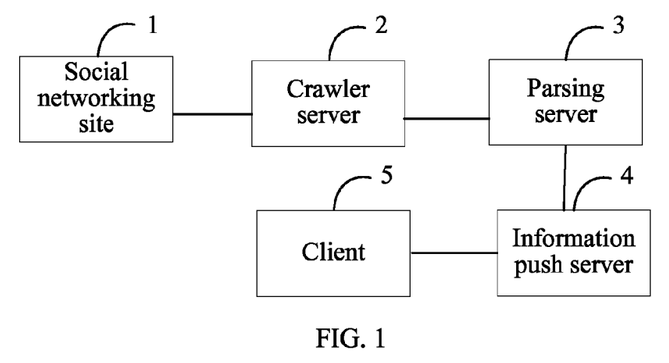
FIG. 1 is an architectural diagram of a system to which an information push method according to an embodiment of the present invention is applicable.

FIG. 1 shows an architecture of a system to which an information push method according to an embodiment of the present invention is applicable, and for ease of description, merely shows a part related to the embodiment of the present invention. The system includes a social networking site 1, a crawler server 2, a parsing server 3, an information push server 4, and a client 5.

The social networking site 1, the crawler server 2, the parsing server 3, the information push server 4, and the client 5 are connected to and communicate with each other in a wired or wireless manner.

The social networking site 1, the crawler server 2, the parsing server 3, or the information push server 4 may be a single server, or may be a server end formed by several functional servers together.

The client 5 may be any terminal device with a network access function and includes but is not limited to a mobile phone, a tablet computer, a desktop computer, and a notebook computer.

In this embodiment, the crawler server 2 collects basic information of a user, historical behavior information of the user, and the like from the social networking site 1 (that is, a social data source such as MicroBlog, Facebook, or Twitter). The basic information of the user includes profile data, such as a user name, a nickname, and a school; and the historical behavior information of the user refers to a related operation of the user in a website, such as information browsing, information reposting, original information publishing, and information commenting.

The crawler server 2 sends the collected basic information of the user, historical behavior information of the user, and the like to the parsing server 3, and the parsing server 3 parses the basic information of the user and the historical behavior information of the user into structured data, that is, data logically expressed and implemented by using a two-dimensional table structure (as shown in Table 1).

TABLE 1

| | User Name 1 | User Name 2 | ... | User Name n |
|---|---|---|---|---|
| Historical Behavior Information of the User | Information publishing | Information commenting | | Information reposting |

The parsing server 3 sends the structured data obtained by parsing to the information push server 4. The information push server 4 divides the structured data obtained by parsing into a session according to a preset rule, specifically, dividing the historical behavior information of the user into a session according to a preset rule, where the session is one or more documents related to a piece of behavior information of the user (for example, information browsing, information reposting, original information publishing, and information commenting), and the preset rule includes but is not limited to division according to a user name or time, for example, historical behavior information of user name 1 is divided into a session according to information published every month, that is, the information published every month is divided into a session, and definitely, further subdivision may be performed, for example, information reposted in a month is divided into a session, original information is divided into a session, and so on. The session includes at least one document, and the document refers to content published by the user, which may be an original microblog of the user, a microblog reposted by the user, a comment published by the user, or the like.

The information push server 4 establishes an initial model according to the session and by using a statistical learning method. Specifically, characteristic information of each document in the session is extracted, and exemplarily, the characteristic information may be extracted according to content and/or author information of each document, where the characteristic information includes whether a user is in the document, whether an original microblog of a user is reposted in the document, comment information included in the document, and the like.

Figure 2:
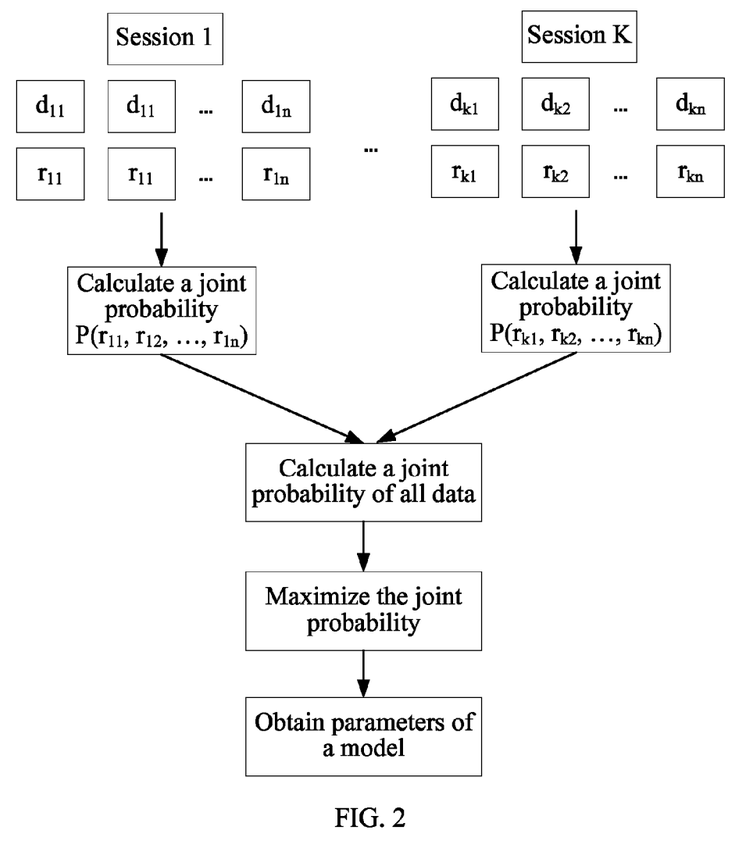
FIG. 2 is a schematic diagram of acquisition of a parameter of a model according to an embodiment of the present invention.

The information push server 4 calculates a joint probability of the document in the session according to the extracted characteristic information, and maximizes the joint probability to obtain a parameter of the initial model (a specific process is shown in FIG. 2, where dkn represents a document, rkn represents characteristic information corresponding to the document, k=1, 2, ..., n, and n=1, 2, ..., m). The joint probability refers to a product of probabilities of generating all documents. For example, for each document, it may be considered that each word of each document is generated according to a probability, so that a probability of generating the whole document is a product of probabilities of successively generating all words in the document; and in this embodiment, the probability of generating the whole document is a product of probabilities of generating characteristic information in the document, for example, P(repost=1)=P(exam=1, satisfy=1)=P(exam=1)P(satisfy=1), P(repost=0)=1−P(exam=1)P(satisfy=1), where P(repost=1) represents a probability of reposting the document, P(repost=0) represents a probability of not reposting the document, P(exam=1) represents a probability of examining the document, and P(satisfy=1) represents a probability of satisfying with the document.

The information push server 4 obtains a final model according to the parameter of the initial model, generates push information based on the obtained final model, and sends the push information to the client 5 where a corresponding user is located, which specifically includes: generating, based on the obtained final model and detected current behavior information of the user, push information matching the current behavior information of the user, and sending the push information to the client 5 where the corresponding user is located; and a specific application scenario is shown as follows:

Scenario 1: User A is browsing a microblog; the information push server 4 detects current behavior information of user A, and sends the current behavior information (that is, microblog browsing) of user A to the model; and the model generates a list of possible user behaviors according to historical microblog-browsing information of user A, where the list of possible behaviors includes microblog content or a microblog user that may interest user A, scores a possible user behavior in the list of possible user behaviors, and pushes first N possible user behaviors with a highest score to a client where user A is located, where the N is greater than or equal to 1.

Scenario 2: The model generates a list of possible user behaviors according to the historical behavior information of the user, where the list of possible behaviors includes multiple pieces of advertisement information, scores a possible user behavior in the list of possible user behaviors, that is, predicts satisfaction of the user with the advertisement information, and pushes first N pieces of advertisement information with highest satisfaction to the client where the user is located, where the N is greater than or equal to 1.

When the satisfaction is calculated or scoring is performed, calculation may be performed according to preset satisfaction or a preset score calculation formula, for example, Satisfaction or score C=Reposting probability*0.5+Commenting probability*0.7−Not-following probability*1.3, where the reposting probability, the commenting probability, and the not-following probability are probabilities of reacting to the push information by the user, which are predicted by the model.

The system scenario provided in this embodiment is merely used to explain the present invention but is not intended to limit the protection scope of the present invention.

Figure 3:
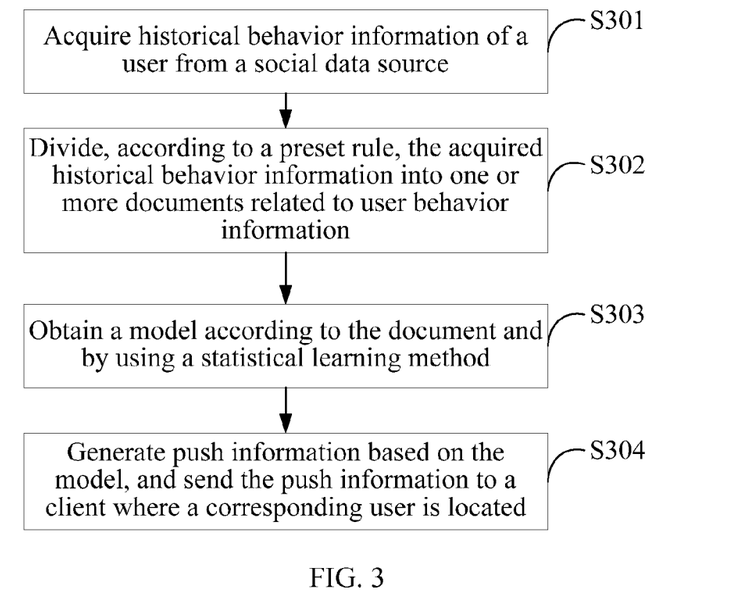
FIG. 3 is a schematic flowchart of an information push method according to an embodiment of the present invention.

Based on the architectural diagram of the system shown in FIG. 1, an embodiment of the present invention provides an information push method. As shown in FIG. 3, a procedure in this embodiment may be executed by the crawler server 2, the parsing server 3, or the information push server 4 in the system shown in FIG. 1, and the process of the method is described in detail as follows:

Step S301: acquire historical behavior information of a user from a social data source.

Specifically, user list information is acquired from the social data source, and then, basic information and the historical behavior information of the user in the user list are acquired from the social data source according to the user list information.

The social data source is a data source including the basic information of the user, the historical behavior information of the user, friend information of the user, and the like, and includes but is not limited to a social network, MicroBlog, Facebook, Twitter, and so on. The basic information of the user includes profile data, such as a user name, a nickname, and a school; and the historical behavior information of the user refers to a related operation of the user in a website, such as information browsing, information reposting, original information publishing, and information commenting.

In this embodiment, in order to associate behavior information of the user in different websites, a same user in different websites may be identified by using a unique identifier, or a similarity between users is calculated according to basic information of the users (a weight factor may be specifically set for each piece of data in the basic information, for example, a weight factor of a telephone number is 0.7), and when a similarity between two users is greater than or equal to a preset similarity threshold, it is considered that the two users are a same user. For example, the preset similarity threshold is 90%. If user A and user B have a same telephone number, a similarity of user A and user B is 70%. If user A and user B have a same telephone number and nickname, a similarity of user A and user B is 90%, it is determined that user A and user B are a same user, and behavior information of user A is associated with that of user B. A manner in a specific embodiment is not limited thereto.

Step S302: divide the acquired historical behavior information, according to a preset rule, into one or more documents related to the user behavior information.

In an actual application, the acquired historical behavior information may be further divided into a session according to a preset rule, where the session includes the one or more documents related to the user behavior information.

Optionally, for ease of statistics and analysis, in this embodiment, before the dividing the acquired historical behavior information into a session according to a preset rule, the method further includes:

parsing the acquired basic information of the user and historical behavior information of the user into structured data, that is, data implemented and logically expressed by using a two-dimensional table structure (as shown in Table 1).

Exemplarily, the historical behavior information in the structured data obtained by parsing is divided into a session according to a user identifier and time, for example, historical behavior information of user name 1 in Table 1 is divided into a session according to information published every month, that is, the information published every month is divided into a session, and definitely, further subdivision may be performed, for example, information reposted in a month is divided into a session, original information is divided into a session, or the like.

The session includes at least one document related to a piece of behavior information of the user, and the document refers to content published by the user, which may be an original microblog of the user, a microblog reposted by the user, a comment published by the user, or the like.

Further, in this embodiment, after the dividing the acquired historical behavior information into a session according to a preset rule, the method further includes:

extracting characteristic information of each document in the session according to the preset rule.

Exemplarily, the characteristic information may be extracted according to content and/or author information of each document, where the characteristic information includes whether a user is @ in the document, whether an original microblog of a user is reposted in the document, comment information included in the document, and the like.

Step S303: obtain a model according to the document and by using a statistical learning method.

Specifically, an initial model is first established according to the document and by using the statistical learning method (for example, the established initial model is $ax2+by+c$, where a, b, and c represent parameters of the model, and x and y represent impact factors), then, a joint probability of the document in the session is calculated according to the extracted characteristic information, and the joint probability is maximized to obtain the parameter of the initial model (that is, values of a, b, and c are obtained), so as to obtain a final model. The statistical learning method includes but is not limited to a probabilistic or non-probabilistic statistical learning method.

It should be noted that, in this embodiment, the model is established by using the statistical learning method because the statistical learning method is neither dependent on a characteristic extraction technology of a specific language (a model establishing method based on a semantic rule in prior art dependent on a characteristic extraction technology of a specific language) and a specific social network environment, and nor dependent on a specific user behavior either; therefore, an application environment of the model established by using the statistical learning method is not limited to MicroBlog or Twitter, and the user behavior is not limited to information reposting or information commenting either, and can be conveniently extended to various different network environments and different user behavior predictions.

Step S304: generate push information based on the obtained model, and the push information is sent to a client where a corresponding user is located.

Preferably, in order to further improve accuracy of information push and enhance the user experience, in this embodiment, before the generating push information based on the obtained model, the method further includes:

detecting current behavior information of the user, where the generating push information based on the obtained model specifically includes:

generating, based on the obtained model and the detected current behavior information of the user, push information matching the current behavior information of the user.

In this embodiment, the detecting current behavior information of the user is specifically detecting a trigger event, such as login to a website and/or information browsing of the user. For example, when the detected current behavior information of the user is microblog browsing, the model pushes a microblog and/or a microblog user that may interest the user to the user according to information that the user historically browses a microblog.

The generating, based on the obtained model and the detected current behavior information of the user, push information matching the current behavior information of the user, and sending the push information to a client where a corresponding user is located specifically includes:

generating a list of possible user behaviors based on the obtained model and the detected current behavior information of the user;

scoring a possible user behavior in the list of possible user behaviors; and pushing first N possible user behaviors with a highest score to the client where the corresponding user is located, where the N is greater than or equal to 1.

In this embodiment, when a score is calculated, calculation may be performed according to a preset score calculation formula, for example, Score C=Reposting probability*0.5+Commenting probability*0.7−Not-following probability*1.3, where the reposting probability, the commenting probability, and the not-following probability are probabilities of reacting to the push information by the user, which are predicted by the model. The possible user behavior refers to information that may trigger a user operation (such as browsing, reposting, or commenting), and the information that may trigger a user operation includes information that may interest the user or the user most wants to view.

It should be noted that, the push information is generated based on the historical behavior information of the user; therefore, when the push information is sent, the information is sent to the client where the corresponding user (that is, a user based on the historical behavior information thereof) is located.

In the embodiment of the present invention, when information is pushed, historical behavior information of a user is first acquired, and a model is generated according to the historical behavior information. Then, push information is generated according to the model and with reference to current behavior information of the user. With the model, a behavioral habit and a preference of the user can be learnt according to the historical behavior information of the user; therefore, push information generated according to the behavioral habit and the preference and the current behavior information of the user is more specific, has higher accuracy, and can better meet a user demand, and enhance user experience.

Figure 4:
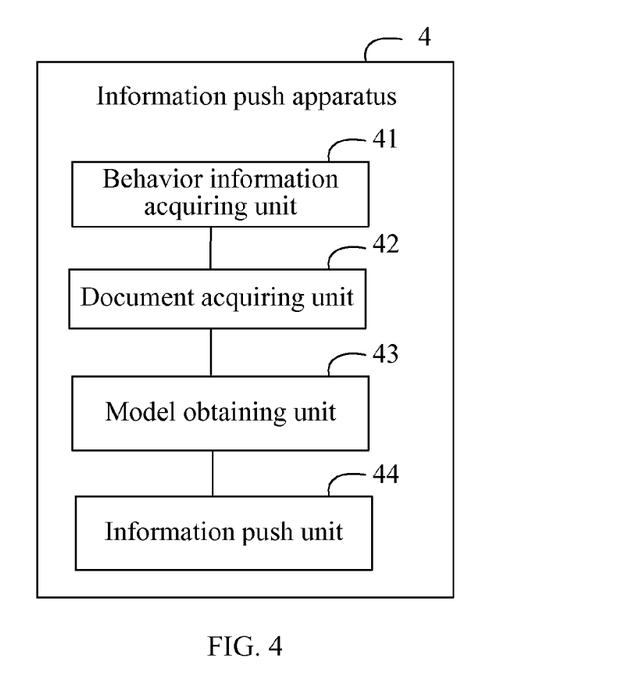
FIG. 4 is a schematic structural diagram of an information push apparatus according to an embodiment of the present invention.

FIG. 4 shows a composition and structure of an information push apparatus according to another embodiment of the present invention, and for ease of description, merely shows a part related to the embodiment of the present invention.

The information push apparatus 4 may be applied to the crawler server 2, the parsing server 3, or the information push server 4 shown in FIG. 1.

The information push apparatus 4 specifically includes a behavior information acquiring unit 41, a document acquiring unit 42, a model obtaining unit 43, and an information push unit 44. A specific function of each unit is described as follows:

The behavior information acquiring unit 41 is configured to acquire historical behavior information of a user from a social data source.

The document acquiring unit 42 is configured to divide, according to a preset rule, the historical behavior information acquired by the behavior information acquiring unit 41 into one or more documents related to user behavior information.

The model obtaining unit 43 is configured to obtain a model according to the document acquired by the document acquiring unit 42 and by using a statistical learning method.

The information push unit 44 is configured to generate push information based on the model obtained by the model obtaining unit 43, and send the push information to a client where a corresponding user is located.

Persons skilled in the art may clearly understand that, for the purpose of convenient and brief description, only the division of the foregoing functional units or modules is used an example for description, and in an actual application, the foregoing functions may be accomplished by different functional units or modules as required, that is, the internal structure of the apparatus is divided into different functional units or modules, so as to accomplish all or a part of the functions in the foregoing description. The functional units or modules in the embodiments may be integrated into one processing unit, or each of the units may exist alone physically, or two or more units are integrated into one unit, and the integrated unit or module may be implemented in a form of hardware, or may also be implemented in a form of a software functional unit. In addition, specific names of all the functional units or modules are merely for facilitating the differentiation between each other, but are not intended to limit the protection scope of this application. For a specific working process of the units or modules in the foregoing apparatus, reference may be made to the corresponding process in the foregoing method embodiments, which is not repeatedly described herein.

Figure 5:
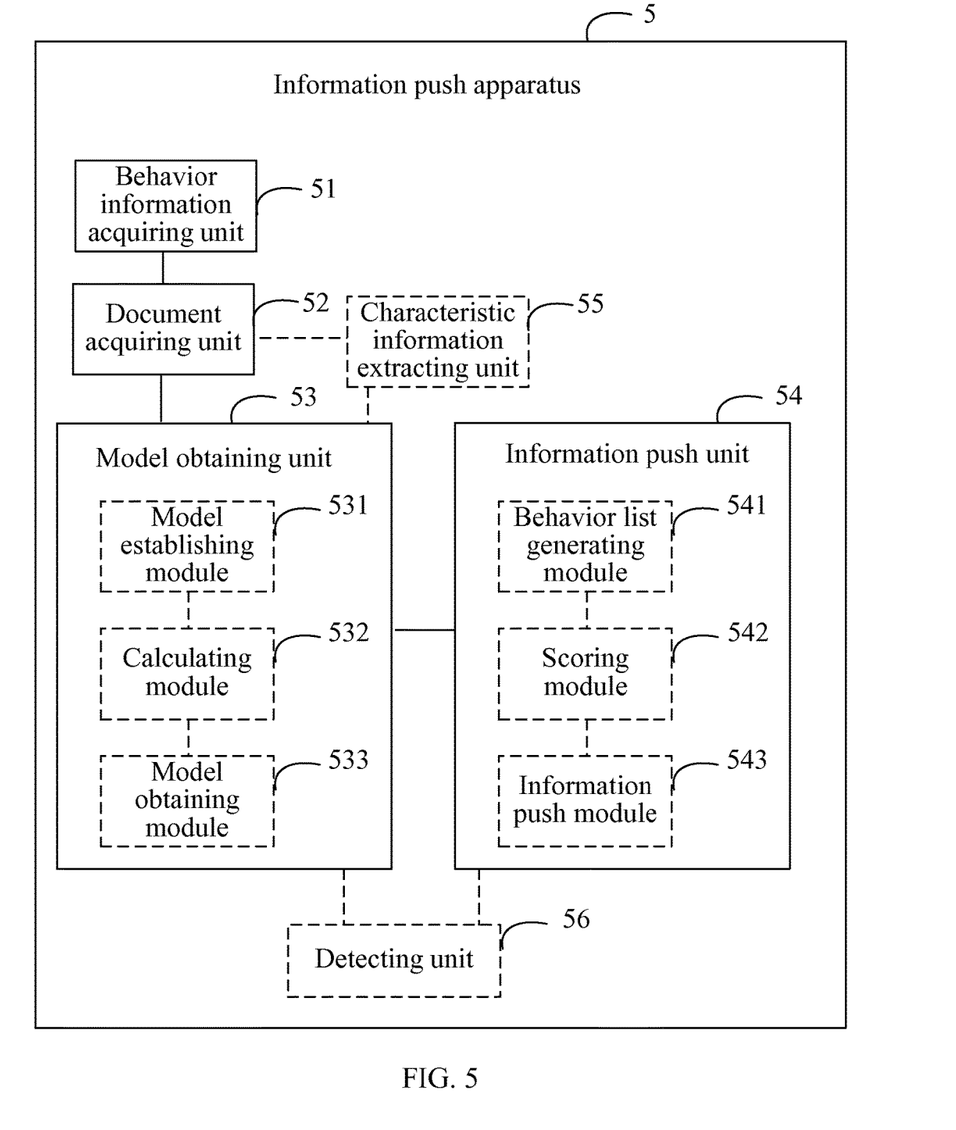
FIG. 5 is a schematic structural diagram of an information push apparatus according to an embodiment of the present invention.

FIG. 5 shows a composition and structure of an information push apparatus according to another embodiment of the present invention, and for ease of description, merely shows a part related to the embodiment of the present invention.

The information push apparatus 5 may be applied to the crawler server 2, the parsing server 3, or the information push server 4 shown in FIG. 1.

The information push apparatus 5 specifically includes a behavior information acquiring unit 51, a document acquiring unit 52, a model obtaining unit 53, and an information push unit 54. A specific function of each unit is described as follows:

The behavior information acquiring unit 51 is configured to acquire historical behavior information of a user from a social data source.

The document acquiring unit 52 is configured to divide, according to a preset rule, the historical behavior information acquired by the behavior information acquiring unit 51 into one or more documents related to user behavior information.

The model obtaining unit 53 is configured to obtain a model according to the document acquired by the document acquiring unit 52 and by using a statistical learning method.

The information push unit 54 is configured to generate push information based on the model obtained by the model obtaining unit 53, and send the push information to a client where a corresponding user is located.

Further, the document acquiring unit 52 is specifically configured to:

divide, according to a user identifier and time, the acquired historical behavior information into the one or more documents related to the user behavior information.

The apparatus 5 further includes:

a characteristic information extracting unit 55, configured to extract characteristic information of each document according to content and/or author information of the document.

Further, the model obtaining unit 53 includes:

a model establishing module 531, configured to establish an initial model according to the document and by using the statistical learning method;

a calculating module 532, configured to calculate a joint probability of the document according to the extracted characteristic information; and a model obtaining module 533, configured to maximize the joint probability to obtain a parameter of the initial model, so as to obtain a final model.

Further, the apparatus 5 further includes:

an information detecting unit 56, configured to detect current behavior information of the user, where the information push unit 54 is specifically configured to generate, based on the model obtained by the model obtaining unit 533 and the current behavior information of the user that is detected by the information detecting unit 56, push information matching the current behavior information of the user, and send the push information to the client where the corresponding user is located.

Further, the information push unit 54 includes:

a behavior list generating module 541, configured to generate a list of possible user behaviors based on the obtained model and the detected current behavior information of the user;

a scoring module 542, configured to score a possible user behavior in the list of possible user behaviors; and an information push module 543, configured to push first N possible user behaviors with the highest score to the client where the corresponding user is located, where the N is greater than or equal to 1.

Persons skilled in the art may clearly understand that, for the purpose of convenient and brief description, only the division of the foregoing functional units or modules is used an example for description, and in an actual application, the foregoing functions may be accomplished by different functional units or modules as required, that is, the internal structure of the apparatus is divided into different functional units or modules, so as to accomplish all or a part of the functions in the foregoing description. The functional units or modules in the embodiments may be integrated into one processing unit, or each of the units may exist alone physically, or two or more units are integrated into one unit, and the integrated unit or module may be implemented in a form of hardware, or may also be implemented in a form of a software functional unit. In addition, specific names of all the functional units or modules are merely for facilitating the differentiation between each other, but are not intended to limit the protection scope of this application. For a specific working process of the units or modules in the foregoing apparatus, reference may be made to the corresponding process in the foregoing method embodiments, which is not repeatedly described herein.

Figure 6:
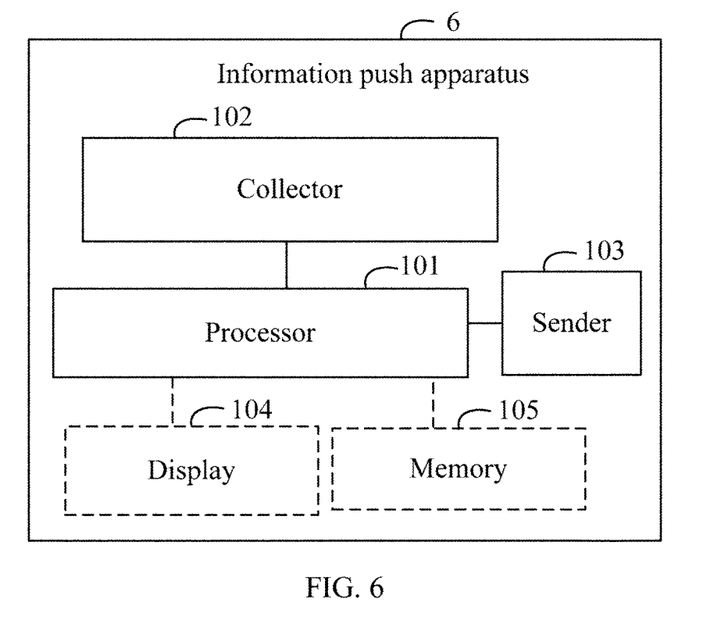
FIG. 6 is a schematic structural diagram of an information push apparatus according to an embodiment of the present invention.

FIG. 6 shows a composition and structure of an information push apparatus according to another embodiment of the present invention, and for ease of description, merely shows a part related to the embodiment of the present invention.

The information push apparatus 6 includes a processor 101, a collector 102, and a sender 103.

The collector 102 is configured to collect historical behavior information of a user from a social data source.

The processor 101 is configured to divide, according to a preset rule, the historical behavior information collected by the collector 102 into one or more documents related to user behavior information, obtain a model according to the document and by using a statistical learning method, generate push information based on the obtained model, and send, by using the sender 103, the generated push information to a client where a corresponding user is located.

When dividing, according to the preset rule, the historical behavior information into the one or more documents related to the user behavior information, the processor 101 may specifically divide, according to a user identifier and time, the historical behavior information into the one or more documents related to the user behavior information.

Further, after dividing, according to the preset rule, the historical behavior information into the one or more documents related to the user behavior information, the processor 101 may further extract characteristic information of each document according to content and/or author information of the document.

Further, when obtaining the model according to the document and by using the statistical learning method, the processor 101 may specifically establish an initial model according to the document and by using the statistical learning method, then, calculate a joint probability of the document according to the extracted characteristic information, and maximize the joint probability to obtain a parameter of the initial model, so as to obtain a final model.

Further, the collector 102 is further configured to collect current behavior information of the user.

In addition, when generating the push information based on the obtained model, the processor 101 may be specifically configured to generate, based on the obtained model and the current behavior information of the user that is collected by the collector 102, push information matching the current behavior information of the user.

Further, the generating, by the processor 101, based on the obtained model and the current behavior information of the user that is collected by the collector 102, push information matching the current behavior information of the user specifically includes:

generating, by the processor 101, a list of possible user behaviors based on the obtained model and the current behavior information of the user that is collected by the collector 102;

scoring, by the processor 101, a possible user behavior in the list of possible user behaviors; and sending, by the processor 101 by using the sender 103, first N possible user behaviors with the highest score to the client where the corresponding user is located, where the N is greater than or equal to 1.

In this embodiment, the processor 101 is a control center of the information push apparatus 6, and is connected to each part of the entire information push apparatus 6 by using various interfaces and lines; the processor 101 processes the historical behavior information and the current behavior information of the user that are collected by the collector 102, then generates the push information, and sends, by using the sender 103, the generated push information to the client where the corresponding user is located.

Optionally, the processor 101 may include one or more processing units, and may be further integrated with an application processor and a modem processor, where the application processor mainly processes an operating system, a user interface, an application, and so on, and the modem processor mainly processes wireless communication. It should be understood that, the modem processor may be not integrated into the processor 101.

It should be noted that, persons skilled in the art may understand that, the information push apparatus 6 may further include a display 104 and a memory 105, where the display 104 may be configured to display an interface that needs to interact with the user in an information processing process. The processor 101 achieves various functions of the information push apparatus 5 by running a software program and a module that are stored in the memory 105. The processor 101 is connected to the collector 102, the sender 103, the display 104, and the memory 105 separately. In addition, the display 104 includes a display panel, and optionally, may be configured with the display panel, such as an LCD (Liquid Crystal Display, liquid crystal display) or an OLED (Organic Light-Emitting Diode, organic light-emitting diode). The memory 105 may include a high-speed random access memory, and may further include a non-volatile memory, for example, at least one disk storage device, a flash memory device, or another volatile solid state storage device. Correspondingly, the memory 105 may further include a memory controller for the processor 101 to access the memory 105.

Persons skilled in the art may understand that, the composition and the structure shown in FIG. 6 are not intended to limit the information push apparatus 6, and may include more or fewer parts than those shown in the figure, or some parts are combined, or different part deployment is performed.

The information push apparatus 6 provided in this embodiment may use the foregoing corresponding information push method, and for details, refer to the related description in the embodiment corresponding to the foregoing information push method in FIG. 3, which is not repeatedly described herein.

To sum up, in the embodiment of the present invention, when information is pushed, historical behavior information of a user is first acquired, and a model is generated according to the historical behavior information. Then, push information is generated according to the model and with reference to current behavior information of the user. With the model, a behavioral habit and a preference of the user can be learnt according to the historical behavior information of the user; therefore, push information generated according to the behavioral habit and the preference and the current behavior information of the user is more specific, has higher accuracy, and can better meet a user demand, and enhance user experience.

In the several embodiments provided in the embodiments of the present invention, it should be understood that, the disclosed system, apparatus, and method may be implemented in other manners. For example, the described apparatus embodiment is merely exemplary. For example, dividing of the units is merely a type of logical function dividing, and there may be other dividing manners during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or in other forms.

The units described as separate parts may or may not be physically separate, and parts displayed as units may or may not be physical units, and may be located in one position, or may be distributed on a plurality of network units. A part or all of the units may be selected according to actual needs to achieve the objectives of the solutions of the embodiments.

In addition, functional units in each embodiment of the present invention may be integrated into one controller, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of the embodiments of the present invention essentially, or the part contributing to the prior art, or all or a part of the technical solutions may be embodied in a form of a software product. The computer software product is stored in a storage medium, and includes several instructions for instructing a computer device (which may be a personal computer, a server, a network device, or the like) or a processor (processor) to perform all or a part of the steps of the methods described in each embodiment of the present invention. The storage medium includes various media that can store program code, such as a USB flash drive, a removable hard disk, a read-only memory (ROM, Read-Only Memory), a random access memory (RAM, Random Access Memory), a magnetic disk, and an optical disc.

The foregoing embodiments are merely intended for describing the technical solutions of the present invention, rather than limiting the present invention. Although the present invention is described in detail with reference to the foregoing embodiments, persons of ordinary skill in the art should understand that they may still make modifications to the technical solutions described in the foregoing embodiments, or make equivalent replacements to some technical features thereof, as long as these modifications or replacements do not cause the essence of corresponding technical solutions to depart from the scope of the technical solution of each of the embodiments of the present invention.

What is claimed is:

1. An information push method comprising:
    acquiring historical behavior information of a user from a social data source;
    dividing, according to a preset rule, the acquired historical behavior information into one or more documents related to user behavior information;
    establishing an initial model according to the one or more documents;
    extracting characteristic information of each document using a statistical learning method;
    obtaining a joint probability of the documents according to the extracted characteristic information;
    maximizing the joint probability to obtain a parameter of the initial model;
    obtaining a final model according to the parameter of the initial model; and
    generating push information based on the model, and sending the push information to a client where a corresponding user is located.

2. The method according to claim 1, wherein the dividing, according to the preset rule, the acquired historical behavior information into the one or more documents related to the user behavior information further comprises:
    dividing, according to a user identifier and time, the acquired historical behavior information into the one or more documents related to the user behavior information.

3. The method according to claim 1, wherein the extracting the characteristic information further comprises:
    extracting the characteristic information of each document according to at least one of (a) content, and (b) author information of each document.

4. The method according to claim 1, wherein before the generating the push information based on the obtained model, the method further comprises:
    detecting current behavior information of the user, wherein
    correspondingly, the generating the push information based on the obtained model further comprises:
    generating, based on the obtained model and the detected current behavior information of the user, the push information matching the current behavior information of the user.

5. The method according to claim 4, wherein the generating, based on the obtained model and the detected current behavior information of the user, the push information matching the current behavior information of the user, and sending the push information to the client where the corresponding user is located further comprises:
    generating a list of possible user behaviors based on the obtained model and the detected current behavior information of the user;
    scoring a possible user behavior in the list of possible user behaviors; and
    pushing first N possible user behaviors with a highest score to the client where the corresponding user is located, wherein the N is greater than or equal to 1.

6. The method according to claim 1, wherein the historical behavior information of the user comprising at least one of: information browsing, information reposting, original information publishing, and information commenting.

7. The method according to claim 1, wherein each of the documents refers to content published by the user.

8. The method according to claim 1, wherein the social data source comprising the basic information of the user, the historical behavior information of the user, and friend information of the user.

9. An information push apparatus, comprising a processor and a non-transitory processor-readable medium having processor-executable instructions stored thereon, the processor-executable instructions including a plurality of units, the units including:
- a behavior information acquiring unit configured to acquire historical behavior information of a user from a social data source;
- a document acquiring unit configured to divide, according to a preset rule, the historical behavior information acquired by the behavior information acquiring unit into one or more documents related to user behavior information;
- a model obtaining unit configured to establish an initial model according to the one or more documents and extract characteristic information of each document by using a statistical learning method, obtain a joint probability of the documents in the one or more documents according to the extracted characteristic information, maximize the joint probability to obtain a parameter of the initial model, obtain a final model according to the parameter of the initial model; and
- an information push unit configured to generate push information based on the model obtained by the model obtaining unit, and send the push information to a client where a corresponding user is located.

10. The apparatus according to claim 9, wherein the document acquiring unit is further configured to:
- divide, according to a user identifier and time, the acquired historical behavior information into the one or more documents related to the user behavior information.

11. The apparatus according to claim 9, wherein the apparatus further comprises:
- a characteristic information extracting unit, configured to extract the characteristic information of each document according to at least one of (a) content and (b) author information of each document.

12. The apparatus according to claim 9, wherein the apparatus further comprises:
- an information detecting unit configured to detect current behavior information of the user, wherein
- the information push unit is further configured to generate, based on the obtained model and the detected current behavior information of the user, the push information matching the current behavior information of the user, and send the push information to the client where the corresponding user is located.

13. The apparatus according to claim 12, wherein the information push unit comprises:
- a behavior list generating module configured to generate a list of possible user behaviors based on the obtained model and the detected current behavior information of the user;
- a scoring module configured to score a possible user behavior in the list of possible user behaviors; and
- an information push module configured to push first N possible user behaviors with a highest score to the client where the corresponding user is located, wherein the N is greater than or equal to 1.

14. The apparatus according to claim 9, wherein the historical behavior information of the user comprising at least one of: information browsing, information reposting, original information publishing, and information commenting.

15. The apparatus according to claim 9, wherein each of the documents refers to content published by the user.

16. An information push system, comprising:
- a crawler server, a parsing server, an information push server, and a client;
- the crawler server, the parsing server, the information push server, and the client are connected to and communicate with each other in a wired or wireless manner;
- the crawler server is configured to collect basic information of a user, historical behavior information of the user, from a social networking site, and send the collected basic information and historical behavior information to the parsing server;
- the parsing server is configured to parse the basic information and the historical behavior information of the user into structured data, and send the structured data obtained to the information push server
- the information push server is configured to divide the structured data into one or more sessions according to a preset rule, wherein each session comprising one or more documents related to a piece of behavior information of the user; establish an initial model according to the one or more sessions and by using a statistical learning method, extract characteristic information of each document, calculate a joint probability of the documents in the one or more sessions according to the extracted characteristic information, maximize the joint probability to obtain a parameter of the initial model, obtain a final model according to the parameter of the initial model, generate push information based on the obtained final model, and send the push information to the client.

17. The information push system according to claim 16, wherein the crawler server, the parsing server, and the information push server are server end formed by several functional servers together.

* * * * *